July 3, 1962  R. LAPSLEY  3,042,163
RETRACTABLE VANE FLUID CLUTCH
Filed Dec. 26, 1957  4 Sheets-Sheet 2

INVENTOR.
ROBERT LAPSLEY
BY
Kenneth C. Witt
ATTORNEY.

July 3, 1962  R. LAPSLEY  3,042,163
RETRACTABLE VANE FLUID CLUTCH
Filed Dec. 26, 1957  4 Sheets-Sheet 3

INVENTOR.
ROBERT LAPSLEY
BY
Kenneth C. Witt
ATTORNEY

United States Patent Office 3,042,163
Patented July 3, 1962

3,042,163
RETRACTABLE VANE FLUID CLUTCH
Robert Lapsley, Berrien Springs, Mich., assignor to Clark Equipment Company, a corporation of Michigan
Filed Dec. 26, 1957, Ser. No. 705,253
25 Claims. (Cl. 192—58)

The present invention relates generally to a fluid clutch of the retractable vane type and more particularly to a fluid clutch employing a plurality of retractable clutch vanes coacting with a driving cam ring to transmit power in either direction between a pair of shafts through a fluid which is able to resist compression.

Retractable vane fluid clutches have been used before in power transmission systems since they are relatively simple to operate and act to complete the power train without any gripping or grabbing action. Moreover, these clutches are self-lubricating, are very quiet in operation and they present no serious problems with respect to wear of the moving parts with the result that their useful life is relatively long. In clutches of this character, it has generally been found desirable to provide for reversibility of the drive, that is, either to transmit the power from an input shaft to an output shaft regardless of the direction of drive of the input shaft or to transmit drive from the output shaft to the input shaft. Specifically, when clutches of this type are employed on a vehicle it is a distinct advantage to be able to transmit the drive from the output shaft to the input shaft so that the vehicle can drive he engine through the clutch and thus provide engine braking. It has also been found desirable to effect the transmission of power in either direction in such manner that the output member can be driven either at about the same speed as the input or at any reduced speed as desired. In other words, the clutch must be capable of being operated at what may be termed a "full drive" wherein the vanes are fully extended in order to rotate the input and output members at substantially the same speed. The clutch must also be operable to provide for controlled slippage between the vanes and the cam ring to provide for the transmission of power at lesser speeds in what may be termed a "creep drive." Finally, the clutch must be operable to fully retract the vanes in order to provide what may be termed a "free" or "slip" drive wherein the vanes are held out of engagement with the cam ring. In order to prevent centrifugal forces from extending the vanes and to increase the efficiency of the clutch, it has been found desirable, in accordance with an important feature of the present invention, to lock the vanes in their retracted position under the "free" drive conditions. The symmetrical arrangement of lobes and vanes provide symmetrical load forces so that the clutch is in complete balance and only transmits the drive from one shaft to the other.

Clutches employing one or more of the above features have been proposed prior to the present invention, but such clutches have generally been characterized by complex construction which makes their size and weight such that they cannot be conveniently used in transmission systems of the type employed on a vehicle where space must be conserved. Moreover, no single clutch heretofore proposed has included all of the useful features discussed above.

It is, therefore, a principal object of the present invention to provide a fluid clutch of the character described which possesses a very large torque capacity but which is nevertheless very compact in construction and efficient in operation. It is another object of the present invention to provide a fluid clutch employing retractable vanes which is operable to effect the transmission of power in either direction between a pair of relatively rotatable members in such manner that the output member can be driven at substantially the same speed as the input member or at any desired reduced speed merely by altering the fluid pressure against the vanes in extended position and allowing fluid to flow from one side of the vanes to the other side.

It is a further object of the invention to provide a fluid clutch of the character indicated wherein a free or slip drive is provided by means of fluid operated plungers which are operable in one position to hold the vanes in retracted position and which may be released by means of the fluid pressure employed to control and fill the clutch.

A further object of the invention is to provide a fluid clutch in which the vanes are both extended and retracted by means of fluid pressure in order to insure proper operation of the clutch as actuated by the operator.

It is another object of the invention to provide a new and improved vane construction which facilitates both the extension and retraction of the vanes by means of fluid pressure.

Another object of the invention is the provision in a clutch of the character described, of a novel reversing valve automatically operable in response to the relative rotations between a pair of rotatable members to control the fluid flow so that power may be transmitted in either direction.

The foregoing and other objects are realized, in accordance with the present invention, by providing a fluid clutch including a rotor driven by an input shaft and a cam ring encircling the rotor and connected to an output shaft. The rotor carries a plurality of spaced apart vanes which are adapted to be selectively extended into engagement with the inner surface of the cam ring in order to transmit power between the shafts through a non-compressible fluid disposed between the rotor and the ring. The vanes are also adapted to be retracted within the rotor to interrupt the power train and permit a "free" drive between the shafts. Both the extension and retraction of the vanes are controlled by fluid pressure, the vane extending fluid being supplied through a rotary shuttle valve which is automatically operated in response to the differential rotation between the rotor and the cam ring to alter the direction of fluid flow in order to permit reverse drive between the shafts. By altering the magnitude of the fluid pressure acting to extend the vanes and to hold them in engagement with the cam ring, the degree of slip between the vanes and the cam ring can be controlled. Thus, when full fluid pressure is supplied, the shafts are rotated at substantially the same speed while reduction in the fluid pressure allows the cam ring to slip with respect to the extended vanes and produces a "creep" drive so that the relative rates of rotation of the shafts can be controlled by adjusting the pressure of the clutch filling fluid pressure.

The invention, both as to its organization and manner of operation, together with further objects and advantages thereof will best be understood by reference to the following detailed description and claims taken in conjunction with the accompanying drawings wherein:

Figures 1, 6, 7:
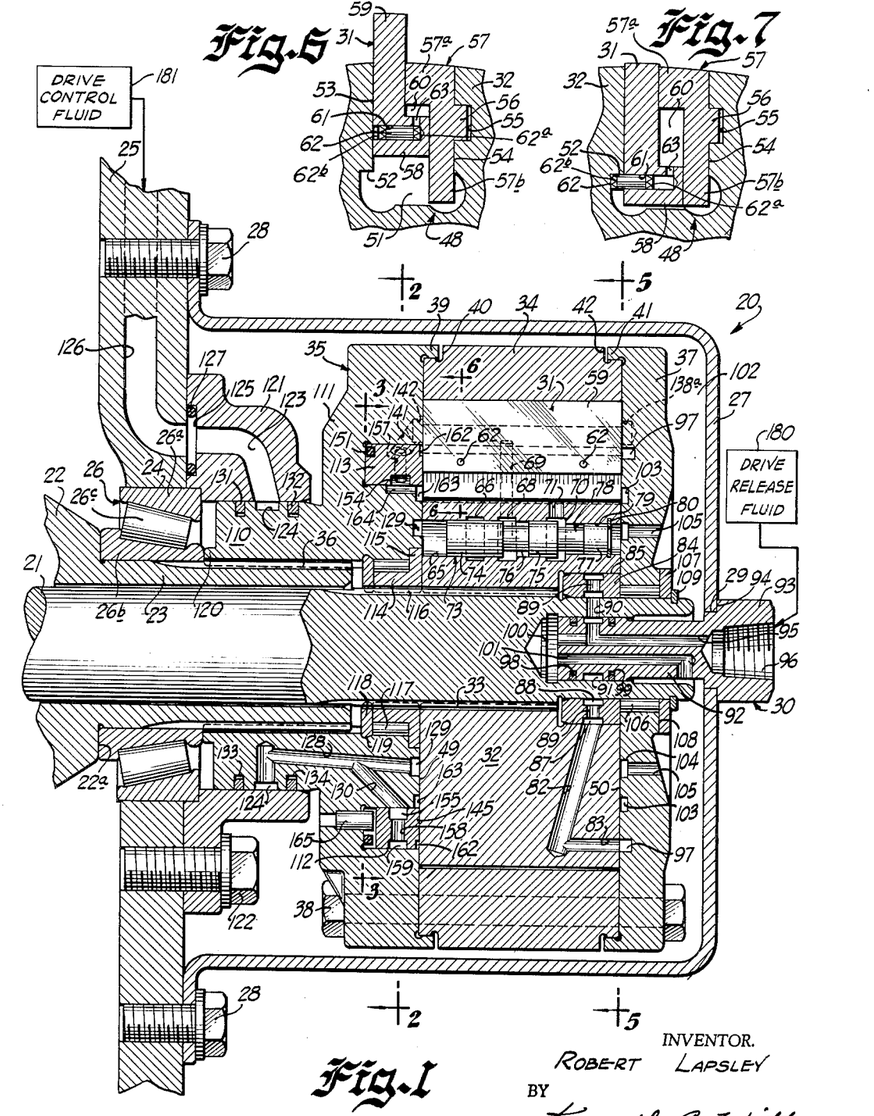
FIG. 1 is a longitudinal, sectional view illustrating a fluid clutch characterized by the features of the present invention.
FIG. 6 is an enlarged, fragmentary, sectional view taken along a line substantially corresponding to the line 6—6 in FIG. 1 and showing the retractable vanes in extended position.
FIG. 7 is a view similar to FIG. 6 but showing the vanes in retracted position.

Referring now to the drawings and particularly to FIG. 1 thereof, the fluid clutch of the present invention is there identified generally by the reference numeral 20 and is illustrated as being operable to transmit drive between an inner shaft 21 and a quill shaft 22 having an axially extending sleeve portion 23 which encircles and telescopes a portion of the inner shaft. As indicated above and as will be described in detail hereinafter, the clutch 20 is adapted to provide drive between the shafts 21 and 22 in either direction. However, for purposes of explanation it will be initially assumed that the inner shaft 21 is driven as, for example, from an internal combustion engine on a vehicle through a power train which may include a torque converter or fluid coupling. Thus, the shaft 21 will hereinafter be referred to as an input shaft or input member while the quill shaft 22, which is adapted to drive the vehicle wheels through appropriate gearing, may be referred to as an output shaft or member. Both the inner shaft 21 and the quill shaft 22 extend through an opening 24 defined in a fixed casing wall 25. A roller bearing assembly generally indicated by reference numeral 26 is fitted within the opening 24 in order rotatably to support the quill shaft 22. This bearing assembly consists of an outer bearing cage 26a drive fitted into opening 24 and an inner bearing race 26b having a number of roller bearings 26c interposed therebetween. The inner bearing race 26b is seated against a shoulder 22a formed on the quill shaft 22 and extending outwardly from the sleeve 23.

The component parts of the fluid clutch 20 are housed within a somewhat cup shaped closure 27 secured to the wall 25 in any suitable manner as, for example, by machine screws 28 passing through spaced openings in a seating flange formed on the closure. A central opening 29 in the end wall of the closure 27 accommodates a fluid inlet fitting 30 for supplying fluid from an operator controlled source 180 for a purpose which will be described more fully hereinafter.

Figure 5:
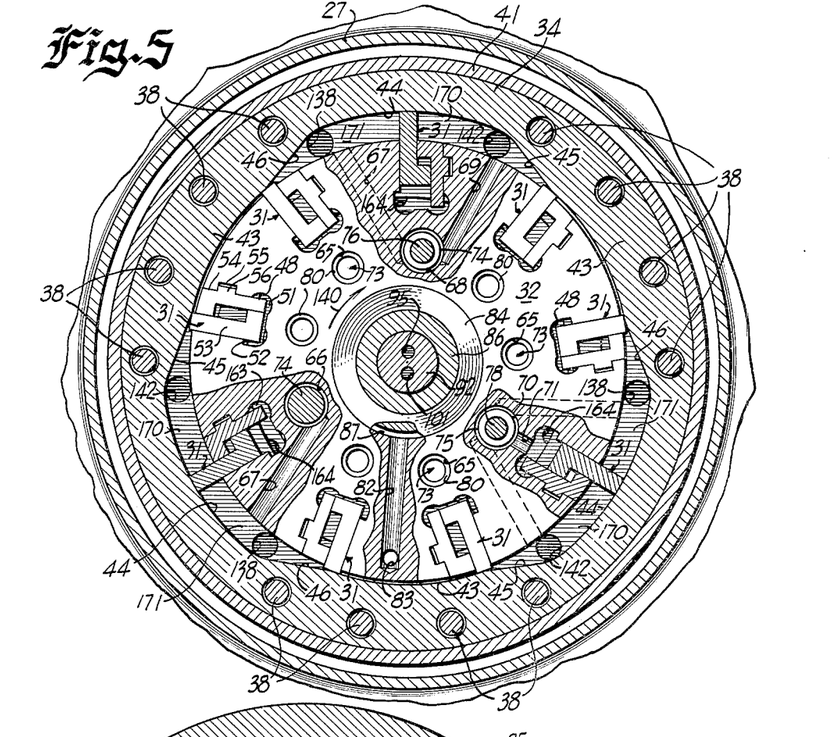
FIG. 5 is a fragmentary, sectional view taken along a line substantially corresponding to the line 5—5 in FIG. 1, assuming again that the latter shows the entire clutch construction, and showing particularly the cam ring and the rotor with the latter being broken away at different depths to illustrate certain details.

To transmit drive between the shafts 21 and 22, a plurality of retractable vanes 31 carried by a rotor 32 act upon a noncompressible fluid to drive a cam ring 34 carried by a drive block 35 splined to the sleeve 23. The spline connection between the drive block and the sleeve 23 is indicated by reference numeral 36 while the rotor 32 is splined to the inner shaft 21 as is indicated at 33. The cam ring 34 is fixedly secured between the drive block 35 and an end block 37 and this assembly is completed by means of a plurality of spaced bolts 38 and cooperating nuts which are tightened to provide a fluid tight connection. To improve the fluid seal, the drive block 35 preferably includes an annular lip 39 which is accommodated within a peripheral recess 40 located at the left hand edge of the cam ring 34 as viewed in FIG. 1. A similar lip 41 on the end block 37 is seated within a second peripheral recess 42 at the right hand side of the cam ring. As is best shown in FIG. 5 of the drawings, the outer periphery of the cam ring 34 is circular in shape but the inner surface includes a plurality of symmetrically spaced apart, inwardly extending cam lobes 43 and a corresponding number of recesses or indentations 44. Each of the lobes includes sloped or tapered edges 45 and 46 leading from the peak of the lobe to the adjacent recesses 44. The cam ring illustrated includes three lobes cooperating with three times as many vanes carried by the rotor, although it should be understood that this construction may be modified depending upon such factors as the desired capacity of the clutch and its intended use. Thus, in very large capacity clutches the number of lobes and vanes is preferably increased while maintaining the same ratio as indicated above.

As is best shown in FIGS. 1 and 5 of the drawings, the rotor 32 is provided with a plurality of spaced apart vane chambers 48 each of which accommodates one of the retractable vanes 31. Each of the chambers 48 extends from one side or face 49 of the rotor to its other side or face 50 and each chamber is enlarged at its inner end as indicated at 51. A shoulder 52 is formed between the enlarged inner end 51 and the side wall 53 of the vane chamber for a purpose which will become evident as the description proceeds. The other side wall 54 of the chamber 48 is provided with an elongated groove or slot 55 (FIGS. 6 and 7) for accommodating a key 56 formed on a fixed vane member 57, thereby to prevent movement of the latter vane member within the chamber. The vane member 57 is somewhat L-shaped in cross section and includes an outer leg 57a and a body portion 57b both of which extend the entire length of the chamber 48 between the faces 49 and 50 of the rotor. The retractable vane 31 is also somewhat L-shaped in cross section and includes a head portion 58 which is movable within the chamber 48 radially of the rotor 32. The head portion 58 is formed integral with a body portion 59 accommodated within an elongated slot defined between the outer leg 57a of the fixed vane 57 and the side wall 53. The head portion 58 fits tightly against the inwardly extending body portion 57b of the fixed vane and the side wall 53 of the vane chamber 48. The movable vane 31 cooperates with the fixed vane 57 to define an elongated fluid chamber 60 the purpose of which will become clear from the ensuing description. It will be readily appreciated that the use of fixed vane member 57 as described and illustrated herein greatly facilitates manufacture of this clutch. Because of the necessity for having overhanging portion 57a to serve as the outer wall of fluid chamber 60, it would be very difficult to form directly in rotor 32 the vane chambers 48 by milling, broaching, and/or other commonly used techniques. Also, the use of separate fixed vane inserts 57 makes it easier to hold the desirable close fits and tolerances during manufacture.

To provide mechanism for locking each of the movable vanes in retracted position, a cylindrical bore 61 defined in the head portion 58 accommodates a fluid operated plunger 62. The bore 61 is connected through a small passage 63 to the chamber 60 so that fluid under pressure delivered to the latter chamber via a path described below functions to extend the plunger 62 outwardly from the bore 61 whenever the movable vane 31 is in the retracted position shown in FIG. 7. The plunger 62 cooperates with the shoulder 52 to hold the movable vane in the retracted position. It will be readily understood that the right ends of the plungers 62 are chamfered, grooved or otherwise provided with recesses 62a which admit fluid under pressure to the end of the plunger to initiate its rectilinear movement. The plungers 62 are also formed with similar chamfers or grooves 62b on the opposite ends to provide for their return operation in a manner described in detail hereinafter.

Referring again to FIGS. 1 and 5 of the drawings, the rotor 32 is provided with a bank of radially spaced valve bores 65, there being one valve bore associated with each of the movable vanes 31. The valve bore 65 includes, from left to right as viewed in FIG. 1, an annular groove 66 connected via a fluid passage 67 (FIG. 5) to the periphery of the rotor, a second annular groove 68 connected via passage 69 to the rotor periphery, and a third annular groove 70 connected via passage 71 to the enlarged bottom 51 of the vane chamber 48. A fluid pressure differential operated valve piston 73 is slideably disposed within each of the valve bores 65. Each of the pistons 73 includes an elongated land 74, a second land 75 separated from the land 74 by means of a recess 76, and a third land 77 separated from the land 75 by an annular recess 78. The lands 74 and 75 are of equal diameter but the land 77 is somewhat smaller in diameter than the lands 74 and 75 and it is accommodated within a smaller diameter section 79 of the valve bore 65. Movement of the valve piston 73 to the right as viewed in FIG. 1 is limited by means of a stop ring 80 seated within an annular groove formed near the right hand side of the valve bore section 79.

As part of the path for fluid flow to the chambers 60, there is provided in the rotor 32 a passage 82 which is connected to the face 50 of the rotor through a passage 83. To facilitate the drilling operation, the passage 82 is preferably inclined with respect to the vertical as is illustrated in FIG. 1. Fluid is delivered to the passage 82 through a fluid supply collar or ring 84 accommodated within an annular recess 85 defined in the inner surface of the rotor. The ring 84 encircles a reduced diameter sleeve portion 86 on the inner shaft 21 and includes a pair of concentric annular grooves 87 and 88 connected by a plurality of radial passages 89 as is illustrated in FIG. 1. The outer groove 87 opens to the passage 82 in the rotor while the inner groove 88 is connected through a radial passage 90 in the sleeve portion 86 to an annular groove 91 formed on the inlet fitting 30. The latter fitting includes a cylindrical body portion 92 fitting snugly within the sleeve 86 together with an enlarged head 93 having a shoulder 94 seated against the portion of the closure 27 surrounding the opening 29. The annular groove 91 in the inlet fitting is connected through an L-shaped passageway 95 to a threaded bore 96 in the head of the fitting. The bore 96 receives a suitable conduit coupling leading to the source 180 for supplying drive release fluid under pressure in order to retract the vanes 31. For convenience, this fluid pressure will hereinafter be referred to as the vane retracting fluid. This fluid flows through passageway 95, through groove 91, through passage 90, through groove 88, through passage 89, through groove 87, through passages 82 and 83 to an annular groove or recess 97 formed in the end block 37 and from the groove 97 it passes into each of the chambers 60 which are accurately aligned with and exposed to the groove 97 and into groove 162 described more fully below, thereby to prevent any side thrust from being caused by pressure unbalanced fluid areas. Sealing rings may be carried within appropriate grooves 98 and 99 formed in the periphery of the inlet fitting 30 for the purpose of preventing escape of the vane retracting fluid along the cylindrical body portion 92. Any leakage fluid which manages to reach the interior of the sleeve portion 86 is carried off through an L-shaped passage 101 in the inlet and is exhausted to space 102 formed between the interior of the closure 27 and the component elements of the clutch 20.

The end block 37, in addition to the groove 97 for the vane retracting fluid, is also provided with a second annular groove 103 communicating with the enlarged portions 51 of all of the vane receiving chambers 48 to counter balance the fluid pressure in grooves 163 and 129 to be described more fully hereinafter. A third annular groove 104 concentric with the grooves 97 and 103 communicates with the smaller diameter end portions 79 of all of the valve bores 65. The groove 104 is connected to the space 102 by means of a plurality of spaced apart passages 105 formed in the end block 37, thereby to provide a path for any leakage fluid which may escape along the periphery of the smaller diameter lands 77 of the valve pistons 73. The end block 37 is mounted for rotation upon the sleeve portion 86 of the inner shaft 21 by means of roller bearings 106. An annular collar 107 is seated against a flatted portion 108 of the end block 37 and a snap ring 109 is inserted within a peripheral groove in the sleeve portion 86 for the purpose of preventing movement of the collar 107, the end block 37 and the remaining components of the clutch toward the right as viewed in FIG. 1.

The drive block 35 includes an axially extending sleeve 110 which, as previously mentioned, is splined to the sleeve 23 of the quill shaft 22, the spline connection being indicated by the reference numeral 36. The main body 111 of the drive block 35 is provided with an annular chamber 112 for accommodating a ring type rotary shuttle valve 113 which functions is a manner to be described more fully hereinafter to permit drive between the shafts 21 and 22 in either direction. To support the drive block 35 upon shaft 21, a bearing ring 114 having a radially extending flange 115 seated within an annular recess defined in the drive block 35 is splined to the inner shaft 21 as is indicated by the reference numeral 116. The flange portion 115 of the bearing ring rests against the face 49 of the rotor 32. Roller bearings 117 are interposed between the outer surface of the ring 114 and the inner surface of the drive block 35 in order to permit rotation of the drive block with respect to the inner shaft. A bearing retainer ring 118 is sealed within an annular indentation 119 in the drive block and rests against the bearing ring 114 in order to hold the bearings 117 in position. The sleeve portion 110 of the drive block 35 is provided with an axially extending lip 120 which is seated against the inner race 26b of the bearing assembly 26 in order to prevent movement of the drive block 35 and its associated elements to the left as viewed in FIG. 1.

A fluid supply ring 121 encircles the sleeve portion 110 for the purpose of directing vane extending fluid in a manner described more fully below. The fluid supply ring 121 is preferably secured to the wall 25 in any suitable manner as, for example, by means of machine screws 122. A passageway 123 formed in the ring 121 opens at one end to an annular groove 124 defined in the sleeve portion 110 and at the other end terminates in a circular opening 125 communicating with a fluid inlet passage 126 defined in the wall 25. The passage 126, in turn, communicates with an operator controlled source of drive control fluid pressure 181. An O-ring 127 is inserted between the wall 25 and the fluid supply ring 121 in order to prevent or inhibit the escape of fluid between these members. Sealing rings 131 and 132 disposed within annular grooves 133 and 134, respectively, in the sleeve portion 110 inhibit the flow of leakage fluid along the interior of the fluid supply ring 121. The small amount of leakage fluid which flows past the sealing rings 131 and 132 together with any leakage fluid which flows along the spline connection 36 functions to provide lubrication for the bearing assembly 26 and the roller bearings 117.

Figure 2:
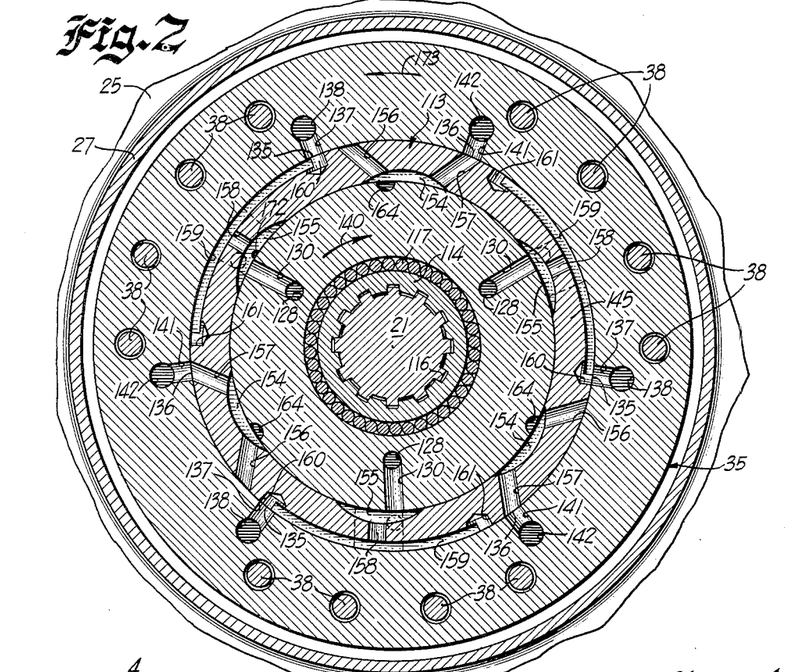
FIG. 2 is a fragmentary, sectional view showing particularly the rotary shuttle valve employed to control the fluid flow and taken along a line substantially corresponding to the line 2—2 in FIG. 1, assuming, of course, that the latter shows the entire clutch construction.

The annular groove 124 in the sleeve 110 communicates with a plurality of passages 128 which are, in turn, connected to an annular groove 129 defined in the drive block 35 adjacent the face 49 of the rotor. The groove 129 is aligned with and opens to all of the valve bores 65 in the rotor 32 and, hence, functions to supply the vane extending fluid to the left hand side of each of the valve pistons 73. As is best shown in FIGS. 1 and 2, each of the passage 128 is connected via inclined passageways 130 to deliver the vane extending fluid to the valve chamber 112. The rotary shuttle valve 113 functions to connect the passages 130 to a first set of ports 135 (FIG. 2) when the shaft 21 and the cam ring 34 are rotating in a forward direction, that is, in the direction indicated by arrow pointed lines 140 in FIGS. 2, 3, 5, 8 and 9. Alternatively, the shuttle valve 113 connects the passages 130 to a second set of ports indicated by the reference number 136 when the drive is reversed as indicated by the arrow pointed line 139 in FIG. 10. The ports 135 are connected by means of inclined passages 137 to ports 138 in order to direct the fluid to one end of cam lobe spaces 44. In similar manner, the ports 136 are connected through inclined passages 141 to ports 142 in order to direct the fluid to the other end of the cam lobe spaces. A group of ports 138a are defined in the end block 37 opening to the face 50 of the rotor with these ports being so positioned that each is aligned with one of the ports 138 or 142, thereby to balance the fluid forces created by the fluid pressures supplied through these ports.

Figures 3, 4:
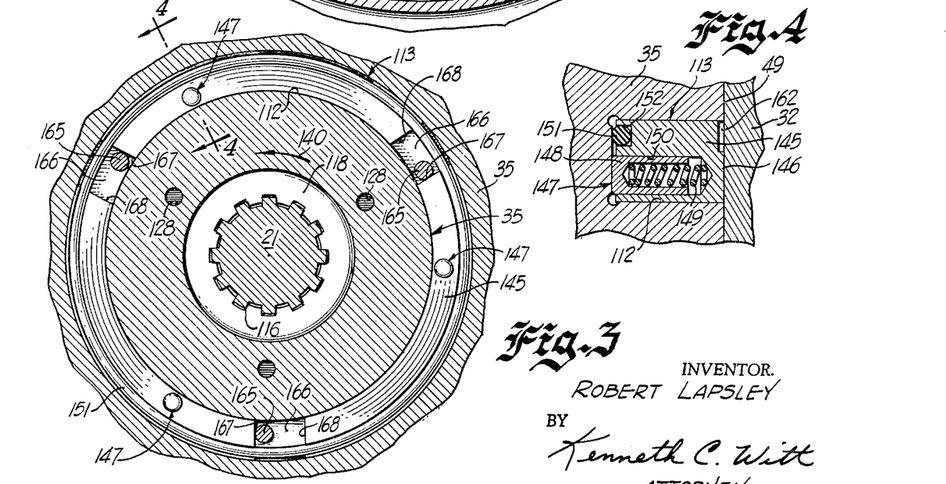
FIG. 3 is a fragmentary, sectional view taken along a line substantially corresponding to the line 3—3 in FIG. 1, assuming again that the latter shows the entire construction.
FIG. 4 is an enlarged, fragmentary, sectional view taken along a line substantially corresponding to the line 4—4 in FIG. 3 and showing particularly the mechanism for holding the shuttle valve against the rotor carrying the retractable vanes.

Considering next the construction of the rotary shuttle valve 113, and referring first to FIGS. 1, 2 and 4, it will be observed that this valve comprises an annular block 145 inserted within the valve chamber 112. The block 145 includes an outer face portion 146 which is urged against the face 49 of the rotor 32 by means of a plurality of spring biased plungers 147. In order to distribute the forces urging the valve block 145 against the rotor, three such spring plungers are preferably provided and each comprises a cylindrical sleeve 148 which is closed at one end and which accommodates a coil spring 149. Each of the sleeves 148 is disposed within a cylindrical opening 150 drilled in the valve block and the coil spring 149 acts between the closed end of the opening 150 and the closed end of the cylinder 148 to force the cylinder into engagement with the drive block 35 and to bias the valve block 145 against the face 49 of the rotor. A ring of relatively small steel balls 151 are inserted within an annular groove 152 (FIG. 4) in the valve block so that these balls seat against the drive block 35 for the purpose of assuring free rotation of valve block 145. As is best shown in FIG. 2, the inner peripheral face of the valve block 145 is provided with a first group of arcuate indentations or grooves 154 and with a second group of similar indentations or recesses 155. To lubricate the engaging faces of the valve block 145 and the drive block 35, there is provided a passage 172 (FIG. 2) extending from one of the receses 155 along the inner periphery of the valve block. Each of the grooves 154 communicates with a pair of inclined fluid passages 156 and 157 leading to the outer periphery of the valve block while each of the grooves 155 is connected through a radial passage 158 in the valve block to an elongated groove 159 defined in the outer periphery of the block. Each of the elongated grooves 159 communicates at one end with a port 160 and at the other end with a port 161, these ports being defined by radial drillings in the valve block 145. An annular groove 162 defined in the face 146 of the valve block opens to the face 49 of the rotor and communicates with all of the chambers 60 in order to provide a fluid force to balance the pressure of the fluid in the groove 97 created by the vane retracting fluid. An annular groove 163 is provided in the drive block 35 adjacent the face 49 of the rotor and in communication with the enlarged portions 51 of all of the vane chambers 48. The groove 163 is connected through a plurality of slots 164 to the arcuate indentations 154.

Since the surface 146 of valve block 145 is biased against the face 49 of the rotor, the frictional forces existing between these surfaces tends to cause rotation of the valve block in the direction of rotation of the rotor. Thus, for example, when the input shaft 21 is driven in the forward direction indicated by the arrow pointed lines 140, the valve block 145 tends to rotate in a clockwise direction as viewed in FIG. 2. This clockwise rotation is limited by means of a plurality of fixed dowel pins 165 carried by the drive block 35 and cooperating with appropriate notches formed in the valve block 145. Specifically, as is best shown in FIGS. 1 and 3, the dowel pins 165 are drive fitted within spaced openings drilled into the block 35 and one end of each of the pins extends into a pin receiving space 166 formed in the valve block 145. The space 166 includes side wall portions 167 and 168 which are engaged by the dowel pins 165 in order to limit the rotation of the shuttle valve 113. Thus, when the input shaft 21 is driven in a forward direction as indicated by the arrow pointed lines 140, the dowel pins 165 engage the walls 167 of each of the spaces 166 to limit the rotation of the valve block 145 and hold it in the position illustrated in FIGS. 2, 3, 8 and 9. Similarly, under reverse drive conditions, the dowel pins 165 engage the side walls 168 of the spaces 166 to hold the shuttle valve in the position illustrated in FIG. 10.

Turning now to the operation of the clutch 20 and considering first the "slip" or "free drive" condition during which it is desired to rotate the inner shaft 21 without driving the quill shaft 22, it should be observed that this condition is attained by delivering oil or other fluid under pressure to the inlet fitting 30 and by relieving the fluid pressure in the inlet passage 126. The fluid supply to the fitting 30 and to the passage 126 may be derived from any appropriate sources 180 and 181 including operator controlled valves for establishing the proper fluid flow. As previously indicated, the vane retracting fluid entering the fitting 30 passes through passage 95 and groove 91 in the inlet fitting, through passage 90 in the sleeve portion 86, through groove 88 passage 89 and groove 87 in the ring 84 through passages 82 and 83 in the rotor and into annular groove 97 in the end block 37. The fluid pressure in the groove 97 is delivered to each of the chambers 60 so that it acts upon the outer surface of the heads 58 of all of the movable vanes 31 to force these vanes radially inward of the rotor to their retracted positions. This fluid pressure also enters groove 162 to balance the pressure in groove 97. Moreover, the fluid pressure in each of the chambers 60 passes through passage 63 to the bore 61 in order to force all of the plungers 62 outwardly from the movable vanes and into engagement with the shoulder 52, thereby locking the movable vanes in their retracted positions. In the absence of vane extending fluid pressure in the enlarged portions 51 of the chambers 48, the plungers 62 remain extended even though the vane retracting fluid pressure is relieved from the chambers 60 and their associated fluid supply paths. The plungers 62, therefore, remain extended until fluid is introduced to the chamber 51 in establishing either the "creep drive" or the "full drive" as described below and, as a result, the movable vanes 31 are all locked in their retracted positions so that no drive is transmitted from the rotor 32 to the cam ring 34. Under these conditions the input shaft 21 rotates freely and the only power delivered to the output shaft 22 is an insignificant amount caused by friction due to the rotation of the rotor 32 within the well lubricated cam ring 34. The "free" or "slip drive" can, of course, be attained irrespective of the direction of drive of the inner shaft 21.

Considering next the operation of the clutch 20 for one of the drive conditions and assuming first that the input shaft 21 is driven in the forward direction indicated by the arrow pointed lines 140, the fluid supply system 181 is effective to deliver fluid under pressure to the passage 126 in the wall 25, while at the same time the fluid pressure delivered to the inlet fitting 30 is either removed or is relatively low. The relative rotation of the drive block 35 with respect to the rotor 32 is indicated by arrow pointed lines 173 with the result that the valve block 145 occupies the position shown in FIG. 3. The vane extending fluid from the passage 126 flows through circular opening 125 and passage 123 in the fluid supply ring 121, through annular groove 124 and passage 128 in the drive block 35 where it is delivered to the annular groove 129 in order to supply fluid under pressure to the left hand end of all of the valve bores 65 as viewed in FIG. 1. The vane extending fluid in passages 128 also flows through passages 130 into grooves 155 in the shuttle valve block 145, through passages 158 into grooves 159, through ports 160 and 135, through passages 137 and through ports 138 to fill the space between the outer periphery of the rotor 32 and the inner surface of the cam ring 34. At this point it should be observed that when the drive condition is established from the "free drive," the vanes 31 are all initially locked in their retracted positions by the plungers 62 in which case the fluid emerging from ports 138 passes through the spaces 44 to the ports 142 where it flows through passages 141, through ports 136, through passages 157, through grooves 154, through slots 164 and into groove 163. The fluid in groove 163 is distributed to the enlarged portions 51 of all of the chambers 48 and this distribution is aided by the groove 103 in the end block 37. The fluid also flows from the chamber portion 51 through passageway 71 and groove 70 into the space 78 between the large diameter land and small diameter land 77 on the valve piston 73. The vane extending fluid delivered to the chambers 48 acts on the exposed ends of the plungers 62 to force the latter into the bores 61 and also acts on the inner surface of the head portion 58 of each of the movable vanes to produce a force component directed radially outward of the rotor. Those movable vanes disposed adjacent the spaces 44 between the cam lobes 43 on the cam ring 34 are fully extended while the movable vanes disposed adjacent the cam lobes are blocked and cannot be fully extended but will move out until stopped by the inner surfaces of the cam lobes.

Figure 8:
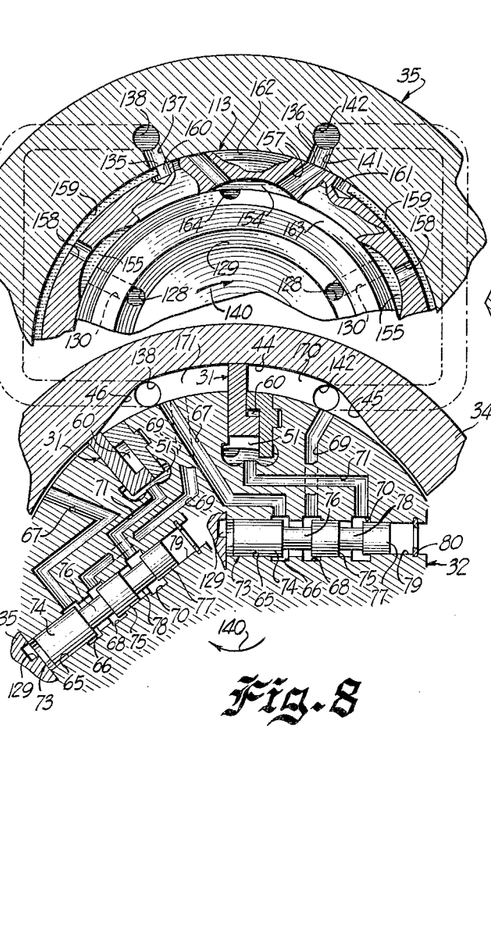
FIG. 8 is a partially diagrammatic, partially schematic and fragmentary view showing the clutch of the present invention engaged for "creep drive"
Figure 9:
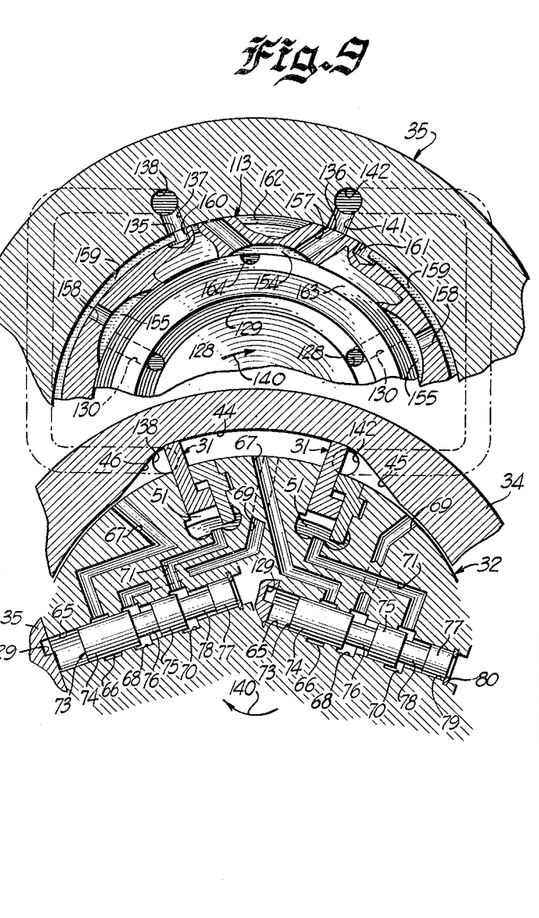
FIG. 9 is a view similar to FIG. 8 but showing the fluid clutch of the present invention engaged for "full drive"

It will be understood that at least three of the movable vanes 31 will be moved fully outward when the vane extending fluid is delivered to the chambers 48, although when the rotor 32 is located in the position shown in FIG. 9, it will be observed that six of the vanes are extended fully while the other three vanes are only partially extended. With the movable vanes extended, the space between the outer periphery of the rotor and the inner surface of the cam ring is divided into two chambers, one of which may be referred to as a pressure chamber identified by reference numeral 170 since it is located in front of the extended vane 31 while the second chamber 171 may be referred to as a suction chamber since it is located in back of the extended vane. As is best shown in FIGS. 8 and 9, each of the pressure chambers 170 is conected through one of the passages 69 in the rotor to the annular groove 68 of its associated differential valve and is also connected through one of the passages 67 to the annular groove 66 of the preceding differential valve in the bank. Each of the suction chambers 171 is connected through passage 67 to the annular groove 66 of its associated differential valve and is also connected through passages 69 to the annular groove 68 of the following valve in the bank. In connection with FIGS. 8, 9 and 10 it should be understood that bores 65 in the rotor 32 and the valve pistons 73 in such bores are rotated out of their true position in order to facilitate an understanding of their connection with other parts of the clutch. These bores and valve plungers actually are aligned axially as shown in FIGS. 1 and 5.

Thus far the description of operation of the clutch is applicable to either "creep drive" or "full drive." Whether the clutch is operative to provide "creep drive" or "full drive" when vanes 31 are extended depends upon whether there is any flow of fluid from pressure chamber 170 to suction chamber 171. Since the flow of fluid from pressure chamber 170 to suction chamber 171 is dependent upon the position of valve piston 73, and the position of valve piston 73 depends upon the pressure of the fluid delivered to passageway 126, it is possible by controlling the pressure delivered to passageway 126 as, for example, by means of a throttling valve, not shown, in the system 181 to engage the clutch either for "creep drive" or "full drive."

When the pressure of the fluid delivered to passageway 126 is of relatively low pressure, the clutch will be engaged for "creep drive." As explained hereinabove, pressure fluid delivered to the clutch through passageway 126 serves to extend vanes 31 and also is conducted to groove 129. The relatively low pressure fluid in groove 129 initially moves valve piston 73 to the right so that fluid communication between the pressure chamber 170 and suction chamber 171 is prevented by land 74 (FIG. 9). Consequently, since vanes 31 are extended, rotor 32 is rotating relatively to cam ring 34 in the direction of arrow pointed line 140 and pressure chamber 170 is out of communication with suction chamber 171, the fluid in chamber 170 will be pressurized. This pressurized fluid is in communication with chamber 51, as explained hereinabove, and also in communication with the space 78 between lands 75 and 77 by means of passageway 71 and groove 70. Since the area of land 75 adjacent space 78 is greater than the area of land 77, the net force exerted by the pressure fluid in space 78 tends to move valve piston 73 to the left; the force produced by the pressure fluid on the face of land 74 adjacent groove 129 resisting such movement. Assuming for exemplary purposes only that the ratio of the net effective area against which the pressure fluid in space 78 acts to the area against which the fluid in groove 129 acts is on the order of one to ten, it will be appreciated that the valve piston 73 will be in equilibrium when the ratio of fluid pressure in space 78 to the fluid pressure in groove 129 is on the order of ten to one, ignoring the force exerted on land 77 by atmospheric pressure which, for all practical purposes, is negligible. As rotor 32 rotates relative to cam ring 34, the pressure in chamber 170 rises and hence the pressure in space 78 also rises. As the pressure in space 78 rises, the force exerted thereby finally overcomes the force exerted by the pressure fluid in groove 129, thereby moving valve piston 73 toward the left. As this happens passage 69 is put in communication with passage 67 thereby permitting flow of fluid from pressure chamber 170 to suction chamber 171 and stopping the rise in fluid pressure in pressure chamber 170. Since land 74 cooperates with groove 66 to provide an orifice thereby controlling the flow of fluid from pressure chamber 170 to suction chamber 171, which in turn determines the pressure of fluid in chamber 170, the position of valve piston 73 in its bore will be such that the force exerted by the pressure fluid in space 78, as determined by the rate of flow of fluid from chamber 170 to 171, balances the force exerted by the pressure fluid in groove 129.

From the foregoing it will be apparent that by varying the pressure of the fluid in groove 129 from a low pressure which moves the valve piston 73 only slightly to the right from its extreme leftward position to a fluid pressure which moves the valve piston 73 to the right a distance sufficient to completely close the orifice means 74, 76, the amount of torque transmitted by the clutch in the "creep drive" can be varied between a minimum when the fluid flow between chambers 170 and 171 is at a maximum to a maximum torque transmittal when the fluid flow between chambers 170 and 171 is at a minimum; cutting off the flow completely results in "full drive."

When the throttling valve is operated to increase the fluid pressure supplied to the ends of the differential valves to a level sufficient to move the differential valves to the right as viewed in FIG. 1 in order to interrupt the connection between the two sides of the vanes, "full drive" is established between the rotor 32 and the cam ring 34 through the fluid and, as a result, the quill shaft 22 and the inner shaft 21 rotate at substantially the same speed.

Specifically, when the fluid supply system 181 is rendered effective to deliver full pressure to the passageway 126, the forces acting to move the pistons 73 to the right overcomes those forces acting in the opposite direction and the valve pistons 73 are moved toward the right. As the valve pistons begin to move, the relatively large area of the lands 74 is exposed to the fluid pressure in the groove 129 so that the forces acting to move the pistons to the right are increased to produce a snap action movement of the pistons until they are seated against the stop ring 80 at which time fluid communication between the pressure chamber 170 and the suction chamber 171 is prevented by the land 74. This condition is illustrated in FIG. 9 wherein it will be observed that the land 74 of each piston blocks the groove 66 and breaks the fluid path between the passages 67 and 69. The only rotation between the shafts under these conditions results from internal fluid leakage and, since the entire system is nearly fluid tight, such leakage will be very small with the result that a highly efficient clutch action is obtained. Any small leakage fluid is replaced by cool fluid from the supply system and this replacement fluid assists in preventing the clutch from over-heating. Moreover, the small amount of leakage fluid between adjacent parts, as indicated previously, effects self-lubrication of the moving clutch components.

Figure 10:
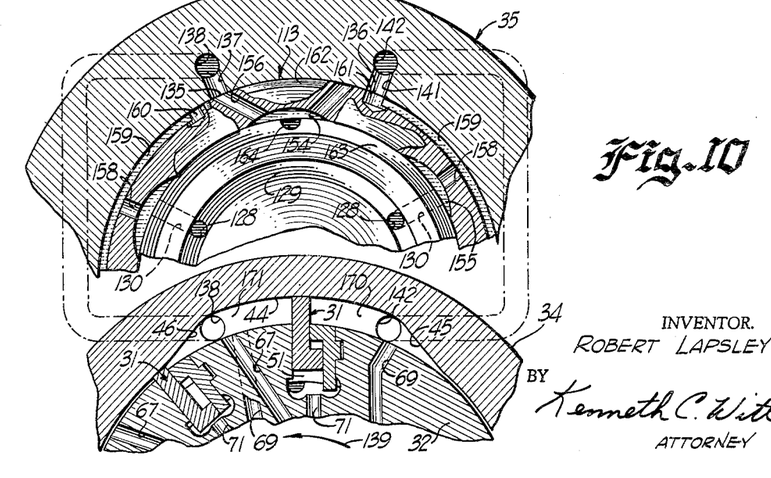
FIG. 10 is a view similar to FIGS. 8 and 9 but showing the operation under reverse drive conditions.

Considering next the reverse drive, it will be observed that this condition is illustrated in FIG. 10 wherein the rotor 32 and the cam ring 34 are shown rotating in the direction of arrow pointed line 139. Reverse drive may be established under either of two conditions; first, when the input shaft 21 is driven from the vehicle engine in the reverse direction; and, second, when the vehicle is descending a steep grade or hill and the wheels tend to overrun the engine shaft so that a drive from the quill shaft 22 to the inner shaft 21 is desirable in order to permit the vehicle to drive the engine shaft for the purpose of providing engine braking. As previously mentioned, to establish the proper fluid flow for reverse drive under either of these conditions the shuttle valve 113 is automatically actuated by the relative rotation between the rotor 32 and the drive block 35 in such manner that its valve block 145 is turned until the walls 168 (FIG. 3) engage the fixed dowel pins 165. Specifically, when the input shaft 21 is driven from the vehicle engine in the reverse direction indicated by the arrow pointed line 139 in FIG. 10, the valve block 145 is automatically rotated by the rotor to its full counterclockwise position where the dowel pins 165 engage walls 168. In similar manner, when the input shaft 21 is being driven in the forward direction and when the output shaft tends to rotate faster than the input shaft, the drive block 35 rotates relative to the rotor until the dowel pins engage walls 168. When the valve block 145 is rotated from the position shown in FIG. 3, that is, from its full clockwise position by either of the described conditions, the flow of fluid between the inlet and outlet ports in the drive block 35 is reversed. Specifically, the passages 157 are moved out of registry with ports 136 so that they are confronted by a blank wall of the drive black and are, hence, blocked or sealed. Passages 156, on the other hand, are moved into alignment with ports 135 as is clearly shown in FIG. 10. At the same time, ports 161 are moved into alignment with ports 136 and ports 160 are moved out of registry with ports 135. The inlet fluid from passages 130 thus flows through recesses 155, passages 158, grooves 159, ports 161 and 136, passages 141 and grooves 142 to the chamber 170 located in back of the vanes. It will be recalled that the chamber 170 in the forward drive condition was located in front of the vanes and was termed the pressure chamber although in reverse drive this chamber obviously becomes the suction chamber. Similarly, chamber 171, which in forward drive conditions was termed the suction chamber, becomes the pressure chamber because it is located in advance of the extended vane. Each of the chambers 171 is connected through port 138, passage 137, port 135, passage 156, recess 154, slot 164 and annular groove 129 to the enlarged portions 51 of all of the vane chambers with the result that fluid pressure is again applied to the inner surface of the heads 58. The vanes 31 are extended as described above and drive is then transmitted between the shafts 21 and 22 in exactly the same manner as described above for the forward drive. If the pressure of the inlet fluid is sufficient to hold differential valves closed a full reverse drive is established while a lesser fluid pressure causes slippage between the rotor and the cam ring and induces the vanes to move through the vane chambers in a manner which will be evident from the foregoing description.

The reverse drive to provide engine braking is automatically interrupted as soon as the speed of rotation of the output shaft 22 is reduced below that of the input shaft 21 since at this time the drive block 35 slows down sufficiently to allow the rotor 32 to rotate the shuttle valve 113 to the forward position where dowel pins 115 engage walls 167. As soon as the shuttle valve is in the forward position, forward drive from the input shaft 21 to the output shaft 22 is re-established in the manner described above.

In operation of the clutch described above, it may be desirable to shift from one direction of drive to the other without releasing the engine throttle in which case the clutch might tend to lock up. Under these conditions a shock load could be imparted to the clutch exceeding its capacity. To prevent such an occurrence, it may be desirable to supply the control fluid pressure gradually so that the clutch is feathered into engagement. To this end, the fluid may be supplied to the passageway 126 through a time delay piston valve which gradually increases the inlet pressure. Until full line pressure is supplied, the clutch will slip exactly as it does in the "creep drive" described above. Moreover, while the fluid supply systems 180 and 181 have been shown as separate and distinct it should be understood that they may receive fluid from a common source such as an engine driven pump or the like with the systems 180 and 181 comprising control valving for directing the fluid.

In view of the foregoing description, it will be recognized that the enumerated objects of the invention have been accomplished by the provision of a highly efficient clutch which is completely self-lubricated and is very quiet in operation. The clutch is shock free since no grabbing or gripping accompanies the clutch actuation. Due to the fact that the fluid forces acting on the clutch parts and particularly on the multiple lobed cam ring are balanced, there are no out of balance forces to cause wear between moving parts and, as a consequence, the useful life of the clutch is very long. All of these advantages are achieved with a compact construction employing a minimum number of parts so that the clutch can be manufactured relatively inexpensively. The described clutch also has a very high capacity with relation to its size although it should be recognized that the clutch capacity can be altered by changes in such factors as the vane height and width, the number of working vanes or cam lobes, the mean effective radius of the vanes, the permissible fluid pressure, and the mechanical efficiency of the clutch. Larger diameter units may be designed which are equally as efficient as the smaller diameter units since there is little or no actual fluid flow into or out of the units. Thus, since the efficiency depends upon the amount of flow and since the maximum fluid flow occurs from one side of a vane to the other, the larger clutches are provided with a greater number of vanes than the smaller units so that the rate of fluid flow in all sizes is about the same. In addition, it will be observed that the latter fluid flow occurs only during the "creep drive" regardless of the clutch size.

It should be understood that, while the invention has been described in detail in conjunction with an illustrative embodiment, many modifications will readily occur to those skilled in this art and it is therefore contemplated by the appended claims to cover any such modifications as fall within the true spirit and scope of the invention.

What is claimed as new and desired to be secured by Letters Patent of the United States is:

1. In a fluid clutch, a cylindrical vane carrier having a plurality of spaced apart vane chambers in the outer surface thereof, said vane chambers extending between the ends of said carrier, a coaxial cam ring assembly surrounding the said vane carrier and having inwardly extending portions at the ends of the vane carrier, a fixed vane secured to said carrier within each of said vane chambers and having a part partially closing the opening in the cylindrical surface, a movable vane having a head portion mounted for movement within each of said vane chambers and cooperating with said fixed vane part to define a fluid chamber therebetween, the ends of the said movable vane disposed in sealing relation with the said inwardly extending portions, and means for selectively supplying fluid under pressure to all of the fluid chambers to retract said vanes within said carrier or for supplying fluid under pressure to said vane chambers to extend said vanes into sealing relation with said cam ring assembly.

2. In a fluid clutch, a cylindrical vane carrier having a plurality of spaced apart vane chambers in the outer surface thereof, the said vane chambers extending between the ends of said carrier, a coaxial cam ring assembly surrounding the said vane carrier and including a cam ring and inwardly extending portions at the ends of the vane carrier, a movable vane having a head portion mounted for movement within each of said vane chambers, means cooperating with each said movable vane to define a fluid chamber, said head portion having a first side exposed to said fluid chamber and a second side exposed to the vane chamber, the ends of each said movable vane being disposed in sealing relation with the said inwardly extending portions, and means for selectively supplying fluid under pressure to all of the fluid chambers to produce a force on said first side to retract said vanes within said carrier or for supplying fluid under pressure to said vane chambers to produce a force on said second side to extend said vanes into sealing relation with said cam ring.

3. In a fluid clutch, a cylindrical vane carrier having a plurality of spaced apart vane chambers in the outer surface thereof, said vane chambers extending between the ends of said carrier, a coaxial cam ring assembly including a cam ring surrounding the said vane carrier and inwardly extending portions at the ends of the vane carrier, a plurality of movable vanes respectively mounted within said vane chambers each having a head portion mounted for movement within and exposed to its associated vane chamber, means cooperating with said movable vane to define a fluid chamber exposed to said head portion, the ends of the said movable vane being disposed in sealing relation with the said inwardly extending portions, and means for selectively supplying fluid under pressure to all of the fluid chambers to move said vanes within said vane chambers in one direction or for supplying fluid under pressure to said vane chambers to move said vanes in the opposite direction into sealing relation with said cam ring.

4. In a fluid clutch, a cylindrical vane carrier having a vane chamber in the outer surface thereof, said vane chamber extending between the ends of said vane carrier, a coaxial cam ring assembly surrounding the said vane carrier and including a cam ring and inwardly extending portions at the ends of the vane carrier, a movable vane mounted for sliding movement within said vane chamber from a retracted position within said carrier to an extended position, a head portion on said movable vane disposed within said vane chamber and dividing said chamber into an inner section and an outer section, the ends of the said movable vane being disposed in sealing relation with the said inwardly extending portions, and means for selectively supplying fluid under pressure to the outer section of said vane chamber to develop a force on said head portion acting to move said vane in one direction or for supplying fluid under pressure to said inner section to develop a force on said head portion acting to move said vane in the opposite direction into sealing relation with said cam ring.

5. In a fluid clutch, a vane carrier having a vane chamber therein, a movable vane mounted for sliding movement within said vane chamber from a retracted position within said carrier to an extended position, a head portion on said movable vane disposed within said vane chamber and dividing said chamber into an inner section and an outer section, means for selectively supplying fluid under pressure to the outer section of said vane chamber to develop a force on said head portion acting to retract said vane or for supplying fluid under pressure to said inner section to develop a force on said head portion acting to extend said vane, and fluid operated means for locking said vane in its retracted position.

6. In a fluid clutch, a vane carrier having a vane chamber therein, a movable vane mounted for sliding movement within said vane chamber from a retracted position within said carrier to an extended position, means for selectively supplying vane retracting fluid under pressure to develop a force on said movable vane acting to retract said vane, means for supplying vane extending fluid under pressure to develop a force on said movable vane acting to extend said vane, a plunger carried by the movable vane and movable laterally with respect to the movement of said vane from a retracted position within the vane to an extended position, stop means on the carrier engaged by said plunger when the latter is extended in order to lock said vane in retracted position, means for supplying the vane retracting fluid to said plunger to extend the latter, and means responsive to the vane extending fluid for retracting said plunger.

7. In a fluid clutch, a vane carrier having a vane chamber therein, a movable vane mounted for sliding movement within said vane chamber from a retracted position within said carrier to an extended position, a head portion on said movable vane disposed within said vane chamber and dividing said chamber into an inner section and an outer section, means for selectively supplying vane retracting fluid under pressure to the outer section of said vane chamber to develop a force on said head portion acting to retract said vane or for supplying vane extending fluid under pressure to said inner section to develop a force on said head portion acting to extend said vane, a plunger carried by said head portion and movable laterally with respect to the movement of said vane from a retracted position within said vane to an extended position, stop means on the carrier engaged by said plunger in its extended position to lock the movable vane in retracted position, means in said chamber for extending said plunger in response to the vane retracting fluid, and means in said chamber responsive to the vane extending fluid for retracting the plunger.

8. In a fluid clutch, a cylindrical vane carrier having a vane chamber including side walls extending inwardly from its periphery, a fixed vane of L-shaped cross-section having a first leg portion secured to said carrier within said vane chamber, and also having a second leg portion disposed near the periphery of the carrier, said second leg portion being spaced from one of the side walls of the vane chamber to define an elongated opening extending between the ends of said carrier, and a movable vane of L-shaped cross-section having a head portion mounted for movement along said one side wall and said first leg portion, said movable vane having a body portion extending through said opening to guide the movement of the movable vane.

9. In a fluid clutch, a cylindrical vane carrier having a vane chamber including side walls extending inwardly from its periphery, a fixed vane having a first leg portion secured to said carrier within said vane chamber and also having a second leg portion adjacent the periphery of said carrier spaced from one of the side walls of the vane chamber to define an elongated opening extending between the ends of said carrier, and a movable vane having a head portion mounted for movement along said one side wall and said first leg portion, said movable vane having a body portion extending through said opening to guide the movement of the movable vane.

10. In a fluid clutch, a cylindrical vane carrier having a vane chamber including side walls extending inwardly from its periphery, a fixed vane of L-shaped cross-section having a first leg portion secured to said carrier within said vane chamber and also having a second leg portion disposed near the periphery of the carrier, said second leg portion being spaced from one of the side walls of the vane chamber to define an elongated opening, a movable vane of L-shaped cross-section having a head portion mounted for movement along said one side wall and said first leg portion, said movable vane having a body portion extending through said opening to guide the movement of the movable vane, means defining a stop on said one side wall, a plunger carried by said head portion and movable laterally with respect to the movement of said vane from a retracted position within the movable vane to an extended position in engagement with the stop means, and means for simultaneously supplying fluid to said head portion and said plunger to retract said movable vane and extend said plunger.

11. In a fluid clutch, a cylindrical vane carrier having a vane chamber including side walls extending inwardly from its periphery, a fixed vane having a first leg portion secured to said carrier within said vane chamber and also having a second leg portion adjacent the periphery of said carrier spaced from one of the side walls of the vane chamber to define an elongated opening, a movable vane having a head portion mounted for movement along said one side wall and said first leg portion, said movable vane having a body portion extending through said opening to guide the movement of the movable vane, means defining a stop on said one side wall, a plunger carried by said head portion and movable laterally with respect to the movement of said vane from a retracted position within the movable vane to an extended position in engagement with the stop means, and means for simultaneously supplying fluid to said head portion and said plunger to retract said movable vane and extend said plunger.

12. In a fluid clutch, the combination of first and second relatively rotatable members, a vane carrier mounted for rotation with the first member and having a plurality of vane chambers therein, a drive assembly mounted for rotation with the second member and including a plurality of cam lobes cooperating with said carrier to define fluid spaces, a vane slidably mounted in each chamber and movable by fluid pressure in the respective vane chamber from a retracted position to an extended position in engagement with the drive assembly, first and second groups of ports opening to said fluid spaces, a first group of parallel passages connected to the vane chambers, a second group of passages in said drive assembly for supplying fluid under pressure, and valve means responsive to the differential rotation between the drive assembly and the carrier and selectively operable to connect the first group of ports to the first group of passages and to connect the second group of ports to the second group of passages in order to establish a forward drive condition between said members and also operable to connect the first group of ports to the second group of passages and to connect the second group of ports to the first group of passages in order to establish a reverse drive condition between said members.

13. In a fluid clutch, the combination of first and second relatively rotatable members, a vane carrier assembly mounted for rotation with the first member and having a plurality of vane chambers therein, a drive assembly mounted for rotation with the second member and including a plurality of cam lobes cooperating with said carrier assembly to define fluid spaces, a vane slidably mounted in each chamber and movable by fluid pressure in the respective vane chamber from a retracted position to an extended position in engagement with the drive assembly, first and second groups of ports opening to said fluid spaces, a rotary valve, a first group of parallel passages connected to the vane chambers, a second group of passages in said drive assembly for supplying fluid under pressure to said rotary valve, biasing means acting against one of said assemblies to force said valve into frictional engagement with the other of said assemblies so that said valve may be turned in opposite directions in response to the differential rotation between said assemblies, and means for limiting the rotation of said valve in each direction so that it occupies either of two limiting positions, said first and second groups of ports being connected to said first and second groups of passages respectively by means of said valve in one of its limiting positions, said first and second groups of ports being connected to said second and first groups of passages respectively by means of said valve in the other of its limiting positions.

14. In a fluid clutch the combination of a clutch housing having a bore at one end; a bearing assembly mounted within said bore; a quill shaft rotatably supported by said bearing assembly and extending outwardly from said housing through said bore; an inner shaft disposed within said quill shaft and extending outwardly from said housing through said bore; a drive assembly rotatable with said quill shaft and including a first block carried by said quill shaft and having a hub portion seated against said bearing assembly, a second block, and a cam ring secured to and interposed between the blocks and having a plurality of cam lobes defining fluid spaces therebetween; a rotor secured for rotation with said inner shaft and having a plurality of vane chambers therein; a vane mounted in each chamber and slidable therein from a retracted position within the rotor to an extended position in engagement with cam ring; passage means in said first block for supplying fluid under pressure to said vane chambres to extend said movable vanes; and means including a fluid passage in said second block for supplying fluid under pressure to retract said vanes.

15. In a fluid clutch the combination of a clutch housing having a bore at one end; a bearing assembly mounted within said bore; a quill shaft rotatably supported by said bearing assembly and extending outwardly from said housing through said bore; an inner shaft disposed within said quill shaft and extending outwardly from said housing through said bore; a drive assembly rotatable with said quill shaft and including a first block carried by said quill shaft, a second block, and a cam ring secured to and interposed between the blocks and having a plurality of cam lobes defining fluid spaces therebetween; a rotor secured for rotation with said inner shaft and having a plurality of vane chambers therein; a vane mounted in each chamber and slidable from a retracted position within the rotor to an extended position in engagement with the cam ring; and means including passages in the first block for supplying fluid under pressure to said vane chambers to extend said vanes.

16. In a fluid clutch the combination of a clutch housing having a first bore at one end and a second bore at the opposite ends; a bearing assembly mounted within said first bore; a quill shaft rotatably supported by said bearing assembly and extending outwardly from said housing through said first bore; an inner shaft disposed within said quill shaft and extending outwardly from said housing through said first bore; a drive assembly rotatable with said quill shaft and including a first block carried by said quill shaft and having a hub portion encircling said quill shaft, a second block, and a cam ring secured to and interposed between the blocks and having a plurality of cam lobes defining fluid spaces therebetween; a rotor secured for rotation with said inner shaft and having therein a plurality of vane chambers and fluid passages therefor; a vane mounted in each chamber and slidable from a retracted position within the rotor to an extended position in engagement with the cam ring; means including a fluid inlet fitting in said second bore for supplying fluid through the passages in said rotor and in said second block to said vane chambers for retracting said vanes; and means including passages in said hub portion and in said first block for supplying fluid to said vane chambers to extend said vanes.

17. In a fluid clutch the combination of first and second relatively rotatable members; a drive assembly rotatable with said first member and including a cam ring having a plurality of cam lobes defining fluid spaces therebetween; a rotor secured for rotation with said second member and having a plurality of vane chambers therein; a vane mounted in each chamber and slidable by fluid pressure in the respective vane chamber from a retracted position within the rotor to an extended position in engagement with the cam ring; a valve chamber defined in said drive assembly; an annular rotary valve positioned within said chamber and provided with first, second and seventh groups of fluid passages; biasing means acting between the rotary valve and the drive assembly for urging said rotary valve into frictional engagement with said rotor so that said rotary valve may be turned in either direction in response to the differential rotation between the drive assembly and the rotor; means for limiting the turning of said rotary valve in each direction so that said rotary valve is moved to either of two positions; a third group of passages in said drive assembly for delivering fluid under pressure to the valve chamber; a fourth group of passages in said drive assembly leading from the valve chamber to the spaces between the lobes of the cam ring; a fifth group of passages in said drive assembly connecting said valve chamber to said spaces; and a sixth group of passages in the drive assembly connecting the valve chamber to all of the vane chambers; said third and fifth groups of passages being connected by means of said first group of passages and said fourth and sixth groups of passages being connected by means of said second group of passages when said valve is in the first of said two positions; said third and fourth groups of passages being connected by means of said first group of passages and said fifth and sixth groups of passages being connected by means of said seventh group of passages when said valve is in the second of said two positions.

18. In a fluid clutch, the combination of first and second relatively rotatable members, a vane carrier assembly mounted for rotation with the first member and having a plurality of vane chambers therein, a drive assembly muonted for rotation with the second member and including a plurality of cam lobes cooperating with said carrier assembly to define fluid spaces, a vane slidably mounted in each chamber and movable by fluid pressure in the respective vane chamber from a retracted position to an extended position in engagement with the drive assembly, first and second fluid delivery means opening to said fluid spaces, first passage means for supplying fluid under pressure to one of the fluid delivery means, second passage means for carrying fluid under pressure from the other of said fluid delivery means, and valve means automatically operable in response to the differential rotation between said assemblies for reversing the connections between the fluid delivery means and the passage means in order to reverse the drive condition between said members.

19. In a fluid clutch the combination of first and second relatively rotatable members, a drive assembly rotatable with said first member and including a cam ring having a plurality of cam lobes defining fluid spaces therebetween; a rotor secured for rotation with said second member and having a plurality of vane chambers therein; a vane mounted in each chamber and slidable by fluid pressure in the respective vane chamber from a retracted position within the rotor to an extended position in engagement with the cam ring; a differential valve associated with each of said vanes and including a piston slidably mounted within a bore in said rotor, said piston having first and second portions of different diameter separated by a first space and a third portion equal in diameter to the second portion and separated from the second portion by a second space; a first passage in said rotor connecting the first space of each of said valves with the chamber of its associated vane; second and third passages in said rotor respectively connecting the valve bore to the periphery of the rotor on different sides of its associated vane; said piston being effective in one position to connect said second and third passages through said second space and effective in a second position to block connection between said second and third passages; and means for delivering fluid under pressure to one end of all of said valves to apply a force tending to move them from the first position to the second position and for delivering fluid to the fluid spaces between the cam ring and the rotor, said piston being returned from its second position to its first position by fluid force in said first space acting on said second piston portion.

20. In a fluid clutch the combination of first and second relatively rotatable members, a drive assembly rotatable with said first member and including a cam ring having a plurality of cam lobes defining fluid spaces therebetween; a rotor secured for rotation with said second member and having a plurality of vane chambers therein; a vane mounted in each chamber and slidable by fluid pressure in the respective vane chamber from a retracted position within the rotor to an extended position in engagement with the cam ring; a valve chamber defined in said drive assembly; an annular rotary valve positioned within said chamber and provided with first, second and seventh groups of fluid passages; biasing means acting between the rotary valve and the drive assembly for urging said rotary valve into frictional engagement with said rotor so that said rotary valve may be turned in either direction in response to the differential rotation between the drive assembly and the rotor; means for limiting the turning of said rotary valve in each direction so that said rotary valve is moved to either of two positions; a third group of passages in said drive assembly for delivering fluid under pressure to the valve chamber; a fourth group of passages in said drive assembly leading from the valve chamber to the spaces between the lobes of the cam ring; a fifth group of passages in said drive assembly connecting said valve chamber to said spaces; and a sixth group of passages in the drive assembly connecting the valve chamber to all of the vane chambers; said third and fifth groups of passages being connected by means of said first group of passages and said fourth and sixth groups of passages being connected by means of said second group of passages when said valve is in the first of said two positions; said third and fourth groups of passages being connected by means of said first group of passages and said fifth and sixth groups of passages being connected by means of said seventh group of passages when said valve is in the second of said two positions; a differential valve associated with each of said vanes and including a piston slidably mounted within a bore in said rotor, said piston having first and second portions of different diameter separated by a first space and a third portion equal in diameter to the second portion and separated from the second portion by a second space; a first conduit in said rotor connecting the first space of each of said valves with the chamber of its associated vane; second and third conduits in said rotor respectively connecting the valve bore to the periphery of the rotor on different sides of its associated vane; said piston being effective in one position to connect said second and third conduits through said second space and effective in a second position to block connection between said second and third passages; and means for delivering fluid under pressure from said third group of passages to one end of all of said differential valves to apply a force tending to move them from the first position to the second position, said piston being returned from its second position to its first position by fluid force acting on said second piston portion.

21. In a fluid clutch the combination of first and second relatively rotatable members, a drive assembly rotatable with said first member and including a cam ring having a plurality of cam lobes defining fluid spaces therebetween; a rotor secured for rotation with said second member and having a plurality of vane chambers therein; a vane mounted in each chamber and slidable by fluid pressure in the respective vane chamber from a retracted position within the rotor to an extended position in engagement with the cam ring; a valve associated with each of said vanes and including a piston slidably mounted within a bore in said rotor; said piston having a groove therein, a first passage in said rotor connecting each valve bore with the chamber of its associated vane; second and third passages in said rotor respectively connecting the valve bore to the periphery of the rotor on different sides of its associated vane; said piston being effective in one position to connect said second and third passages by means of said groove and effective in a second position to block connection between said second and third passages; means for delivering fluid under pressure to one end of all of said pistons to apply a force tending to move them from the first position to the second position and for delivering fluid to the fluid spaces between the cam ring and the rotor; and means for returning the piston from the second position to the first position.

22. In a controllable vane fluid clutch, an outer cam having equally spaced cam lobes on its inner periphery, a vane rotor freely rotatable within the cam ring and having three times as many equally spaced vanes as there are lobes in the cam ring, first and second side members attached to the opposed sides of the cam ring having fluid ports symmetrically located at each end of all cam lobes, a ring valve recessed into the first side member for rotation relative to said first side member and rotatable in opposite directions in response to relative rotation between the cam ring and the rotor, means for limiting the rotation of said valve between first and second positions, said vanes and said rotor defining spaces beneath said vanes, resilient means to urge said ring valve against the side of said vane rotor for limited rotation in the direction of rotation of said rotor to selectively direct the fluid pressure between said cam lobes and vanes to said spaces in the said rotor beneath said vanes in order to extend said vanes into firm contact with the inner periphery of the cam ring, first fluid passageways in said ring valve continuously connected to the said spaces below said vanes and connected through the ring valve when the latter is in its first position to the fluid ports at one end of all cam lobes and connected through the ring valve when the latter is in the second position to the fluid ports at the other end of all cam lobes, a differential area, fluid pressure actuated, pressure control valve associated with each vane, second and third passages in said rotor respectively connecting the control valve to the periphery of the rotor on different sides of its associated vane, said valve being provided with fluid passageways to control flow through said second and third passages from the fluid pressure sides of all vanes to the suction sides of all vanes, means responsive to the pressure in the said spaces beneath said vanes tending to move said pressure control valves to a first position wherein fluid flows between the opposite sides of all of the vanes, operator actuated adjustable drive control fluid pressure directed to the suction sides of all vanes and to all pressure control valves to resist said pressure from beneath said vanes and thereby operate said valves to control fluid flow through said valves, vane retracting fluid piston means for retracting said vanes from said cam lobe ring to allow free rotation of said vane rotor relative to said cam lobe ring and provide a free-slip of the clutch, vane latching means to lock said vanes within said vane rotor against centrifugal force, and operator actuated means for delivering vane retracting and latching fluid pressure, to all of the vane retracting fluid pistons and latching means.

23. In a fluid clutch the combination of first and second relatively rotatable members, a drive assembly rotatable with said first member and including a cam ring having a plurality of cam lobes defining fluid spaces therebetween; a rotor secured for rotation with said second member and having a plurality of vane chambers therein; a vane mounted in each chamber and slidable from a retracted position within the rotor to an extended position in engagement with the cam ring; means for supplying fluid under pressure to said chambers to extend said vanes; a valve associated with each of said vanes and mounted in the rotor; first passage means in the rotor for each valve extending from one side of each vane to the respective associated valve; second passage means in the rotor for each valve extending from the other side of each vane to the respective associated valve, said first and second passage means being connected through said valve; and means for supplying said fluid under pressure to each of said valves in order to move it from a first position wherein it is effective to connect said first and second passage means to a second position wherein it is effective to interrupt the connection between said first and second passage means.

24. In a fluid clutch, a vane carrier having a plurality of spaced apart vane chambers therein, a fixed vane secured to said carrier within each of said vane chambers and having a part closing a portion of one end thereof, a movable vane having a head portion mounted for movement within each of said vane chambers and cooperating with said fixed vane part to define a fluid chamber therebetween, stop means on said carrier, a plunger carried by said head portion and movable laterally with respect to the movement of said vane between a retracted position within said vane and an extended position in engagement with said stop means in order to lock said movable vane in retracted position, and means for selectively supplying vane retracting fluid under pressure to all of the fluid chambers to retract said vanes within said carrier and extend said plungers and for supplying vane extending fluid under pressure to said vane chambers to extend said vanes and retract said plungers.

25. In a fluid clutch, a vane carrier having a vane chamber therein, stop means on said carrier, a movable vane having a head portion mounted for movement within said vane chamber, means having a part closing a portion of one end of said chamber cooperating with said movable vane to define a fluid chamber, said head portion having a first side exposed to said fluid chamber and a second side exposed to the vane chamber, a plunger carried by said head portion and movable laterally with respect to the movement of said vane between a retracted position within said vane and an extended position in engagement with said stop means in order to lock said movable vane in retracted position, and means for selectively supplying a first fluid pressure to the fluid chamber to retract said vane within said carrier and extend said plunger and for supplying a second fluid pressure to said vane chamber to extend said vane and retract said plunger.

(References on following page)

References Cited in the file of this patent

UNITED STATES PATENTS

| | | | |
|---|---|---|---|
| 1,472,930 | Mayer | Nov. 6, | 1923 |
| 1,599,439 | Staude | Sept. 14, | 1926 |
| 1,828,861 | De Hart | Oct. 27, | 1931 |
| 2,237,647 | Willans | Apr. 8, | 1941 |
| 2,242,734 | Whittlesey | May 20, | 1941 |
| 2,319,238 | Kendrick | May 18, | 1943 |
| 2,400,186 | Armentrout | May 14, | 1946 |
| 2,409,995 | Morton | Oct. 22, | 1946 |
| 2,571,063 | Roth | Oct. 9, | 1951 |
| 2,739,447 | Newhall | Mar. 27, | 1956 |
| 2,743,090 | Newhall | Mar. 27, | 1956 |
| 2,811,048 | Dence et al. | Oct. 29, | 1957 |
| 2,838,244 | Oldberg | June 10, | 1958 |

FOREIGN PATENTS

| | | | |
|---|---|---|---|
| 444,414 | Germany | May 17, | 1927 |